US006557535B2

(12) United States Patent
Stone

(10) Patent No.: US 6,557,535 B2
(45) Date of Patent: May 6, 2003

(54) SYSTEM AND METHOD FOR TRANSFERRING HEAT FROM EXHAUST GASSES TO COMPRESSED GAS FUEL

(75) Inventor: Kevin Stone, San Diego, CA (US)

(73) Assignee: ISE Research Corporation, San Diego, CA (US)

( * ) Notice: Subject to any disclaimer, the term of this patent is extended or adjusted under 35 U.S.C. 154(b) by 0 days.

(21) Appl. No.: 09/851,631

(22) Filed: May 8, 2001

(65) Prior Publication Data

US 2002/0166545 A1 Nov. 14, 2002

(51) Int. Cl.[7] ................................................. F02G 5/00
(52) U.S. Cl. ........................................ 123/527; 123/557
(58) Field of Search ................................ 123/527, 557, 123/3

(56) References Cited

U.S. PATENT DOCUMENTS

| 4,787,359 A | 11/1988 | Blake | 123/568 |
|---|---|---|---|
| 4,909,192 A | 3/1990 | Förster et al. | 123/25 C |
| 4,972,821 A | 11/1990 | Mauller | 123/557 |
| 5,035,227 A | 7/1991 | Hansen | 123/557 |
| 5,257,609 A | 11/1993 | Reed et al. | 123/557 |
| 5,394,852 A | * 3/1995 | McAlister | 123/435 |
| 5,462,021 A | * 10/1995 | Minami et al. | 123/3 |
| 5,515,814 A | 5/1996 | Cooke | 123/3 |
| 5,687,697 A | 11/1997 | Ishikawa | 123/520 |
| 5,746,188 A | 5/1998 | Cooke | 123/549 |
| 5,778,860 A | 7/1998 | Garcia | 123/557 |
| 5,794,601 A | * 8/1998 | Pantone | 123/557 |
| 5,896,847 A | 4/1999 | Usuki | 123/557 |

* cited by examiner

Primary Examiner—Willis R. Wolfe
Assistant Examiner—Hyder Ali
(74) Attorney, Agent, or Firm—Procopio, Cory, Hargreaves & Savitch, LLP

(57) ABSTRACT

A system and method for transferring heat from the exhaust of an internal combustion engine to a fuel container storing compressed gas fuel, using a gaseous heat transfer medium. The heat transferred to the fuel container assists expansion and/or vaporization of the compressed gas fuel. The expanded and/or vaporized compressed gas fuel may be delivered to the internal combustion engine for use by the engine.

60 Claims, 4 Drawing Sheets

SYSTEM AND METHOD FOR TRANSFERRING HEAT FROM EXHAUST GASSES TO COMPRESSED GAS FUEL

BACKGROUND OF THE INVENTION

The present invention relates generally to systems and methods for controlling the temperature of compressed gas fuels such as compressed natural gas (CNG) and Hydrogen ($H_2$), and for controlling the temperature and vaporization of liquified compressed gas fuels such as liquefied natural gas (LNG), propane, and liquefied petroleum gas (LPG). More particularly, the present invention relates to controlling the temperature of compressed gas fuel within a fuel supply system by using a gaseous heat transfer medium to transfer heat from the exhaust of an internal combustion engine to the fuel supply system.

A typical compressed gas fuel supply system includes a fuel container, such as a metallic tank, containing the fuel under pressure, and a valve at one end to access the contents thereof. The fuel container is filled with a compressed gas fuel, which may be liquified. In systems where the compressed gas fuel is liquefied, the liquified compressed gas fuel is vaporized under ambient heat to provide an operating pressure under which the vaporized fuel is withdrawn through the tank valve. As vapor is withdrawn, the remaining liquid vaporizes and, in doing so, absorbs an amount of heat known as the latent heat of vaporization. This causes the temperature of the remaining liquid to decrease, which in turn reduces its ability to vaporize. Due to continued withdrawal of the vapor, the pressure of the system continues to fall, and the liquid temperature continues to decline. If the fuel temperature is permitted to drop below freezing, various elements of the fuel supply system, such as control devices, may not function properly. Since heat absorbed during vaporization of the liquid must be replenished from heat in the environment surrounding the fuel container, the temperature and vapor pressure inside the fuel container will decrease below functional limits unless sufficient heat is available in the environment surrounding the fuel container.

Like liquified compressed gas fuel systems, gas fuel supply systems utilizing compressed gas fuel that is not liquiefied also absorb heat as the fuel flows through the system. Compressed gas fuel systems absorb heat when the gas is expanded to lower the gas pressure below the tank pressure, as in pressure regulators. Typically, less heat is absorbed when expanding a compressed gas than when vaporizing a liquified compressed gas. Nonetheless, gas fuel supply systems that expand compressed gas fuel must be supplied with heat to avoid excessive temperature and pressure drops, as explained above with reference to liquified compressed gas fuel supply systems.

The temperature of the vaporizing liquid in the fuel container can be raised or maintained by supplying heat to the fuel container from the environment surrounding the fuel container. In home heating applications, for instance, tanks with large surface areas for heat transfer are used with low vapor flow rates, so sufficient heat may be available in the ambient atmosphere. In large stationary applications such as power plants, vaporization heat may be supplied by exposing the tank to a large body of water, such as a lake or ocean. But in mobile applications, such as in motor vehicles powered by compressed gas fuel (e.g., hybrid electric transit buses powered indirectly by turbines run on propane), large tanks or large heat sinks are not practical.

Motor vehicles powered by compressed gas fuel have used the freely available waste heat from the liquid engine coolant to ensure fuel vaporization and fuel temperature. In existing high pressure gaseous fuel systems, hot liquid engine coolant is circulated through a small coolant-to-fuel heat exchanger to add heat to the fuel, preventing freezing of the fuel control components. The heat exchanger is typically added to the fuel system at the exit of a pressure regulator, or may be incorporated into the pressure regulator itself. A typical system is disclosed in U.S. Pat. No. 5,540,208, wherein a compressed gas fuel supply system is used to supply compressed gas fuel to an internal combustion engine of an automobile. The liquid-phase gas fuel is vaporized by means of a heat exchanger, using liquid as the heat transfer medium.

A disadvantage of using liquid, such as engine coolant, as the heat transfer medium is that liquid engine coolant often requires a significant amount of time to reach normal operating temperature. During this delay, insufficient heat may be available to properly vaporize the compressed gas fuel. Other disadvantages of using liquid as the heat transfer medium are that such systems tend to leak, tend to corrode the heat exchanger, and require regular maintenance. Finally, air-cooled engines, including some turbine engines, do not use liquid engine coolant, and, thus, expensive retrofitting would be required to utilize liquid as the heat transfer medium.

SUMMARY OF THE INVENTION

An aspect of the present invention involves a system and method for transferring heat from the exhaust of an internal combustion engine to a fuel container storing compressed gas fuel, using a gaseous heat transfer medium. The heat transferred to the compressed gas fuel container assists expansion of compressed gas fuel, and assists vaporization of liquified compressed gas fuel. The expanded and/or vaporized compressed gas fuel may be delivered to the internal combustion engine for use by the engine.

Another aspect of the invention involves a compressed gas fuel supply system for use with an exhaust system of an internal combustion engine. The compressed gas fuel supply system includes a container with a compressed gas fuel that may be liquified, an exhaust heat transfer system, and a gaseous heat transfer medium that circulates through the exhaust heat transfer system. The exhaust heat transfer system is in thermal communication with the exhaust system of the internal combustion engine for heat transfer from the exhaust system to the gaseous heat transfer medium. The exhaust heat transfer system is also in thermal communication with the fuel container for heat transfer from the gaseous heat transfer medium to the fuel container for expanding the compressed gas fuel, and/or at least partially vaporizing liquified compressed gas fuel.

Another aspect of the invention involves a method of expanding compressed gas fuel and/or vaporizing liquified compressed gas fuel from a fuel container, wherein the fuel container is part of a compressed gas fuel supply system for use with an exhaust system of an internal combustion engine. The method includes providing an exhaust heat transfer system in thermal communication with the exhaust system of the internal combustion engine and the fuel container, the exhaust heat transfer system including a gaseous heat transfer medium that circulates therethrough; transferring heat from the exhaust heat transfer system to the gaseous heat transfer medium circulating through the exhaust heat transfer system; and transferring heat from the gaseous heat transfer medium circulating through exhaust heat transfer system to the compressed gas fuel in the fuel container so as to assist said compressed gas fuel to expand, and/or to assist said liquified compressed gas fuel to at least partially vaporize.

An additional aspect of the invention involves a compressed gas fuel supply system comprising a pressure regulator for expanding the compressed gas and lowering its pressure, and a fuel container that may be a small finned heat exchanger. The fuel container is placed directly after the pressure regulator. The invention further involves an exhaust heat transfer system, and a gaseous heat transfer medium that circulates through the exhaust heat transfer system. The exhaust heat transfer system is in thermal communication with the exhaust system of an internal combustion engine for heat transfer from the exhaust system to the gaseous heat transfer medium. The exhaust heat transfer system is also in thermal communication with the fuel container for heat transfer from the gaseous heat transfer medium to the fuel container to add heat to the compressed gas fuel as it expands through the pressure drop created by the pressure regulator.

A further aspect of the invention involves an exhaust heat transfer system for use with a fuel container including a compressed gas fuel and/or a liquified compressed gas fuel, and an exhaust system of an internal combustion engine. The exhaust heat transfer system includes an exhaust heat transfer member in thermal communication with the exhaust system of the internal combustion engine, a heat exchanger in thermal communication with the fuel container, and one or more connection members connecting the heat exchanger and the exhaust heat transfer member for circulating a gaseous heat transfer medium therethrough to remove heat from the exhaust system and add heat to the fuel container for expansion of the compressed gas fuel, and/or for vaporization of the liquified compressed gas fuel.

Other and further objects, features, aspects, and advantages of the present invention will become better understood with the following detailed description of the accompanying drawings.

BRIEF DESCRIPTION OF DRAWINGS

The following drawings illustrate both the design and utility of preferred embodiments of the invention.

DETAILED DESCRIPTION OF THE PREFERRED EMBODIMENTS

Figure 1:
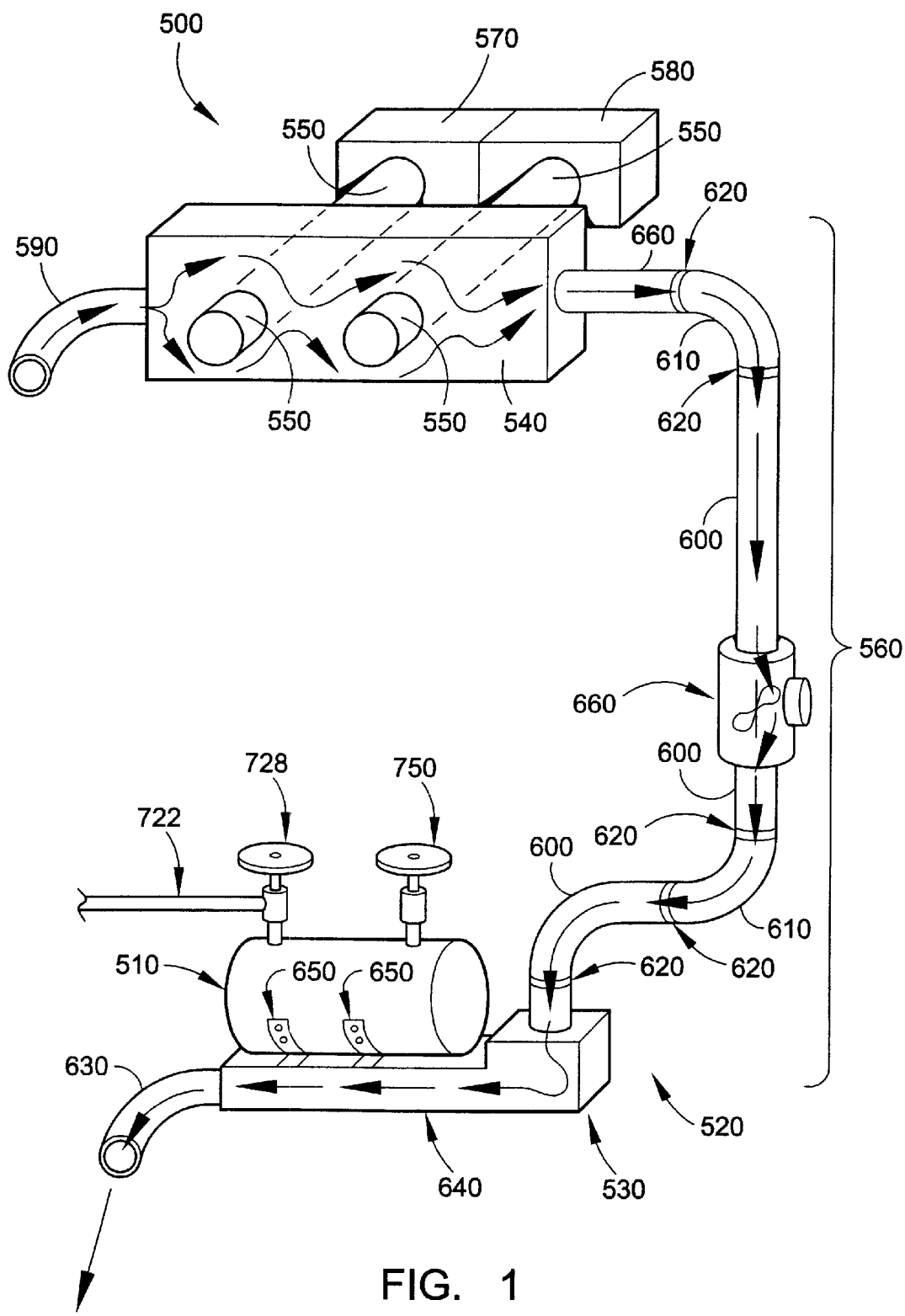
FIG. 1 is a perspective view of a compressed gas fuel supply system constructed in accordance with an embodiment of the present invention.

With reference to FIG. 1, a compressed gas fuel supply system 500 constructed in accordance with an embodiment of the present invention will now be described. As used herein, compressed gas fuels include fuels which are gaseous at ambient conditions, and which are gaseous and/or liquified when compressed. Compressed gas fuels which are typically gaseous when compressed include, but not by way of limitation, compressed natural gas (CNG) and Hydrogen ($H_2$). Compressed gas fuels which are readily liquified when compressed include, but not by way of limitation, liquified natural gas (LNG), propane ($C_3H_8$), liquefied petroleum gas (LPG), and any other readily liquified, gaseous substance (typically comprising a compound of carbon and hydrogen, or hydrocarbon) useful as a fuel for domestic or industrial applications or for internal-combustion engines.

Liquified compressed gas fuels are to be distinguished from liquid fuels such as gasoline and diesel fuel, which are normally a liquid at atmospheric conditions, and are not typically vaporized or expanded prior to combustion. For instance, propane ($C_3H_8$) boils at $-49°$ F. to $32°$ F. under normal atmospheric conditions, while a typical gasoline boils at $149°$ F., and a typical diesel fuel boils at $250°$ F. (IBP boiling points of fuels classified as OSH PEL ACHIG TLV with 10 mg/M3 Detergents and Petroleum Distillates with 100 ppm PEL (NIOSH)).

Though systems have been proposed for vaporizing liquid fuels, such as gasoline, prior to delivery to an internal combustion engine, such systems require the addition of high temperature heat to the liquid fuel, and thus expose the liquid fuel to dangerously high temperatures (600 degrees Fahrenheit, for instance). U.S. Pat. No. 4,972,821 generally discloses such a system. Systems have been proposed that expose the liquid fuel to such high temperatures by routing the liquid fuel in close proximity with exhaust manifolds. Importantly, though systems that vaporize liquid fuel at high temperatures have been theoretically proposed, none are commercially available, since such systems present an unreasonably dangerous explosion hazard. In sharp contrast, the present system relates to compressed gas fuel, which can often be expanded and/or vaporized under near ambient conditions. Since compressed gas fuels may be vaporized at safe temperatures, the present system avoids the dangers inherent to liquid fuel vaporization systems, such as exposing the fuel to very high temperatures by flowing the fuel in close proximity to hot exhaust gasses. Thus, the present system utilizes exhaust heat to vaporize compressed gas fuel via an exhaust heat transfer system 520, without routing the compressed fuel in close proximity with exhaust manifolds or any other dangerously hot surface.

The compressed gas fuel supply system 500 generally includes a tank or reservoir 510 and an exhaust heat transfer system 520. The heat transfer system 520 transfers heat from exhaust gases to compressed gas fuel stored in the tank 510. The heat transfer system 520 includes a heat exchanger 530 for adding heat to the tank 510, an exhaust heat transfer member 540 to guide a gaseous heat transfer medium over exhaust heat transfer surface 550, and one or more connection members or ducting 560 to connect the exhaust heat transfer member 540 to the heat exchanger 530. The gaseous heat transfer medium is a gas such as, but not limited to, atmospheric air, filtered air, recirculated or partially recirculated air, or any other nonflammable gaseous medium capable of transferring heat. The exhaust heat transfer surface 550 (e.g., exhaust manifold, heat shield, muffler, exhaust pipe, etc.) is heated by exhaust gasses exhausted from internal combustion engine(s) 570, 580. Although two exhaust heat transfer surfaces 550 are shown in conjunction with two internal combustion engines 570, 580, the number of exhaust heat transfer surfaces 550 and/or number of internal combustion engines may vary (e.g., 1, 3, 4, etc.) and are not necessarily the same. The gaseous heat transfer medium transfers heat from the heatable surface 550 to the tank 510 to expand compressed gas fuel and/or to at least partially vaporize liquified compressed gas fuel stored in the tank 510. The heatable surface 550 is preferably remote from the tank 510, so that the amount of heat transferred from the heatable surface 550 to the tank 510 may be controlled.

The tank 510 is typically a metallic tank, and in one embodiment, the tank 510 holds a volume of five gallons. To allow for surges in fuel flow, a tank 510 is utilized instead of tubing to hold the compressed gas fuel during heat transfer. If conventional tubing without a reservoir were used, surges in fuel flow might cause uneven heating of the fuel, possibly resulting in inadequate fuel expansion and/or vaporization. In systems using liquified compressed gas fuel, inadequate fuel vaporization may cause liquified compressed gas fuel to reach the combustion system, instead of vaporized compressed gas fuel. If liquified compressed gas fuel reaches the combustion system, mechanical damage may result due to the increased energy content of the fuel. For example, a volume of liquified compressed propane may have an energy content 270 times greater than the same volume of compressed propane gas. Thus, it is critical that liquified compressed gas fuel be vaporized before it is introduced to a combustion system, such as internal combustion engine(s) 570, 580.

The internal combustion engine(s) 570, 580, may be one or more turbine engines, reciprocating engines, rotary engines, or any other internal combustion engine that exhausts hot gasses adjacent one or more exhaust heat transfer surfaces 550. A single internal combustion engine 570 can be used or different types of internal combustion engines may be used in a single application. Since the present system uses a gaseous heat transfer medium, the present system is especially helpful when used with non-liquid-cooled internal combustion engines; however, the present system can be used with liquid-cooled internal combustion engines. The engine(s) 570, 580 are preferably located above the tank 510, so that if the tank 510 leaks compressed gas fuel, the compressed gas fuel will tend to leak downward, away from the heat of the engine(s) 570, 580 and exhaust heat transfer surfaces 550.

The one or more connection members or ducting 560 may include intake 590 for the inlet of the gaseous heat transfer medium into the exhaust heat transfer member 540, which in a preferred embodiment is a twenty-inch diameter galvanized steel tube. The heat transfer member 540 may vary in construction. The ducting 560 may include one or more straight sections 600 and/or elbow sections 610 of galvanized steel ducting connected with one or more clamps 620. The ducting 560 may include flexible tubing. The ducting 560 may include one or more connection members made of a material other than steel tubing. For example, but not by way of limitation, the ducting 560 may include one or more connection members made from a metal other than steel, ceramic, or polymer, such as plastic or rubber. Portions of the ducting 560 nearest the exhaust heat transfer surfaces 550 preferably comprise metallic or ceramic materials, while portions remote from the exhaust heat transfer surfaces 550 may comprise polymer materials. The ducting 560 may also include an exit port 630 for outletting the gaseous heat transfer medium from the heat exchanger 530.

The heat exchanger 530 may include a chamber 640 that receives the gaseous heat transfer medium from the ducting 560. The chamber 640 is proximate the tank 510, so that the gaseous heat transfer medium may transfer heat from the chamber 640 to the tank 510. In one embodiment, the chamber 640 is located beneath the tank 510 or fuel supply line. The chamber 640 may be attached with the tank 510 by a fastening mechanism 650, such as bracketry, fasteners, or welding. The gaseous heat transfer medium flows through the chamber 640 and out the exit port 630.

In certain embodiments, the gaseous heat transfer medium may be caused to flow through the exhaust heat transfer member 540, ducting 560, and heat exchanger 530 by convection currents, relative wind speed, an air pump, a fan 660 or the like. The fan 660 helps the gaseous heat transfer medium flow through the exhaust heat transfer system. In one embodiment, the fan 660 is a twelve-volt, in-line axial tube fan sold in McMaster Carr catalogs. In this embodiment, the temperature of the gaseous heat transfer medium is preferably kept below 120 degrees Fahrenheit, to prevent damage to the fan 660, and to prevent overheating the tank 510 and/or compressed gas fuel. The fan 660 could be thermostatically controlled to prevent overheating.

In use, exhaust heat is absorbed by the gaseous heat transfer medium of the exhaust heat transfer system 520 and the heat is transferred from the gaseous heat transfer medium to the compressed gas fuel stored in the tank 510 to expand and/or at least partially vaporize the compressed gas fuel for any well-known fuel purpose. More specifically, the exhaust gases produced by the internal combustion engine(s) 570, 580 and running near the exhaust heat transfer surface(s) 550 cause the exhaust heat transfer surface(s) 550 to be heated. This heat is absorbed by the gaseous heat transfer medium flowing through the exhaust heat transfer member 540. The heated gaseous heat transfer medium flows (possibly with the assistance of an air pump, fan, etc.) through the ducting 560 to the heat exchanger 530. The heat exchanger 530 is in thermal communication with the tank 510. Heat is transferred from the gaseous heat transfer medium to the compressed gas fuel stored in the tank 510, causing the compressed gas fuel to expand and/or at least partially vaporize. The gaseous heat transfer medium exits the heat exchanger 530 through the outlet 630. In an alternative embodiment, the gaseous heat transfer medium may be circulated back through the ducting and the intake 590 to the exhaust heat transfer member 540.

The compressed gas fuel supply system 500 described above with respect to FIG. 1 may be used for any well-known fuel supplying purpose.

In contrast, with reference to FIGS. 2 and 3, a compressed gas fuel supply system 700 constructed in accordance with another embodiment of the invention will be described in which the compressed gas fuel from the supply tank 510 is supplied to the internal combustion engine(s) 570, 580 to fuel the internal combustion engine(s) 570, 580. The compressed gas fuel supply system 700 is similar to the compressed gas fuel supply system 500 discussed above with respect to FIG. 1, but the compressed gas fuel supply system 700 also includes a fuel communication network 710 connecting the tank 510 with the internal combustion engine(s) 570, 580 for supplying the one or more internal combustion engines 570, 580 with expanded and/or vaporized compressed gas fuel. In this embodiment, the compressed gas fuel supply system 700 may be part of a motor vehicle. The internal combustion engine(s) 570, 580 may power the vehicle. The internal combustion engine(s) 570, 580 consume the compressed gas fuel stored in the tank 510. The engine(s) 570, 580 may power the vehicle directly, as in a conventional motor vehicle, or indirectly, as in some types of hybrid electric vehicles. In an exemplary embodiment, the compressed gas fuel supply system 700 is used in a bus. The bus may be a series-type hybrid electric vehicle with two turbine engines coupled to generators that generate electricity to charge batteries, the batteries powering an electric motor that drives the vehicle. U.S. Pat. No. 6,209,672 provides a description of how internal combustion engines have been used to power Hybrid Electric Vehicles (HEVs), and is incorporated herein by reference as though set forth in full.

Figure 3:
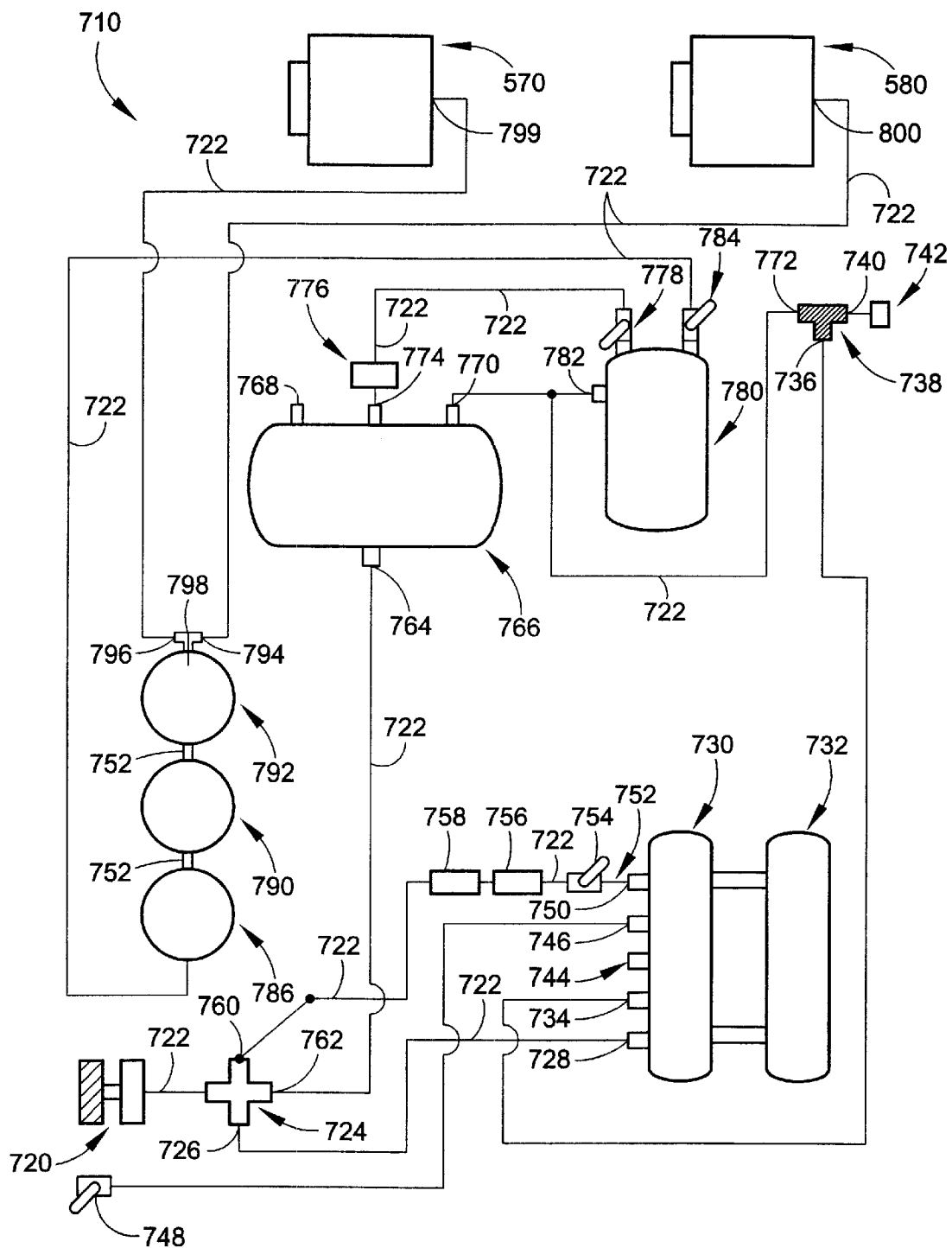
FIG. 3 is a schematical view of an embodiment of a fuel communication network of the compressed gas fuel supply system illustrated in FIG. 2.

With reference specifically to FIG. 3, the fuel communication network 710 of the compressed gas fuel supply system 700 and the flow therethrough will now be described in detail. Compressed gas fuel is added via an external fill port 720, through fuel line 722, through a four-way junction 724, through a first output port 726 of the four-way junction 724, through fuel line 722, through a fill port 728 of a manifold 730, and into a front compressed gas fuel tank 732. In a preferred embodiment, the fuel line 722 comprises steel braided synflex; however, the fuel line 722 may be made of one or more different materials.

The front compressed gas fuel tank 732 is vented through a vent port 734 of the manifold 730, to a first input port 736 of three-way tee 738, and out an output port 740 of the three-way tee 738 to a vent 742. In an embodiment where the network 710 is implemented in a bus, the vent 742 may be located on the roof of the bus, on the passenger side, above an air-conditioning compartment. In one embodiment, a liquid port 744 of the manifold 730 is not used. A purge port 746 of the manifold 730 is connected with fuel line 722 to a purge valve 748 for purging the compressed gas fuel out of the front tank 730.

Compressed gas fuel in either liquid or vapor form leaves the front tank 732 through a vapor port 750 of manifold 730, through fuel pipe 752, through a first shut-off valve 754, through fuel line 722, through a first solenoid valve 756, through a check valve 758, through fuel line 722, into an input port 760 of the four-way junction 724, out a second output port 762 of the four-way junction 724, through fuel line 722, to a fill port 764 in a rear fuel tank 766. In one embodiment, the rear tank 766 is a five gallon steel tank. The rear tank 766 has an unused liquid port 768, and a vent port 770, which is connected by fuel line 722 to a second input port 772 of the three-way tee 738, and to output port 740 of the three-way tee 738 to the vent 742. Vaporized compressed gas fuel should pass through a vapor port 774 of the rear tank 766, through a second solenoid valve 776, through fuel line 722, through a shut-off valve 778, and into a small surge tank 780.

The small surge tank 780 has a vent port 782 which is connected by fuel line 722 to the second input port 772 of the three-way tee 738, and to output port 740 of the three-way tee 738 to the vent 742. In a preferred embodiment, the small surge tank 780 is formed from steel, is spherically shaped, is approximately twelve inches in diameter, and has a wall thickness of approximately one-quarter inch. Expanded and/or vaporized compressed gas fuel exits the small surge tank 780 through a shut-off valve 784, through fuel line 722, through a first filter 786, through fuel pipe 752, through a second filter 790, through fuel pipe 752, and through a regulator 792. The regulator 792 may regulate pressure and/or flow rate of the expanded and/or vaporized compressed gas fuel.

Expanded and/or vaporized compressed gas fuel leaves the regulator 792 and flows through two exit ports 794, 796 of a tee 798. Fuel flowing through exit port 796 flows through fuel line 722 to an input port 799 on the first internal combustion engine 570. Fuel flowing through exit port 794 flows through fuel line 722 to an input port 800 on the second internal combustion engine 580. The engine(s) 570, 580 combust the expanded and/or vaporized compressed gas fuel, generating hot exhaust gasses.

Figure 2:
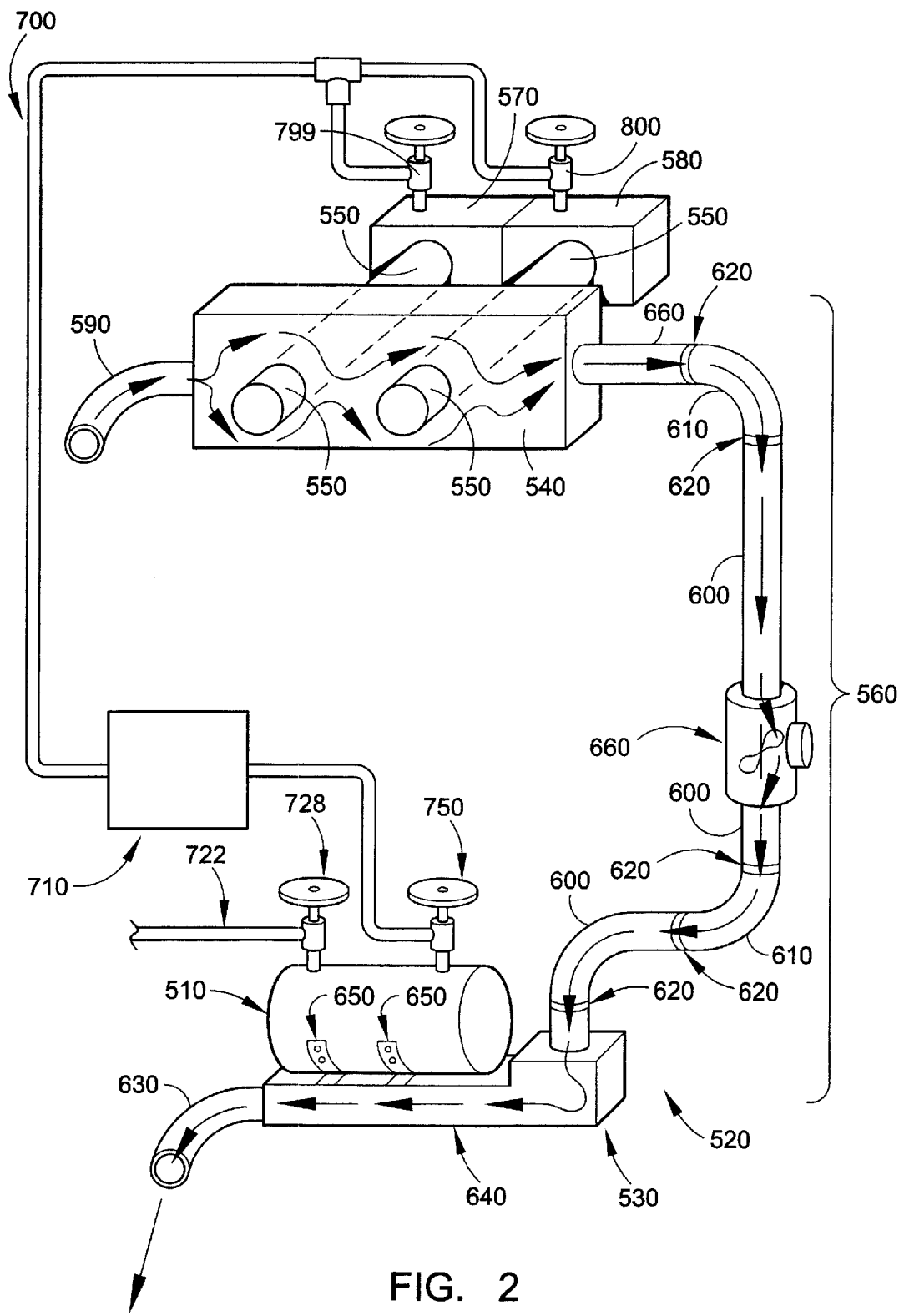
FIG. 2 is a perspective view of a compressed gas fuel supply system constructed in accordance with an additional embodiment of the present invention.

In the embodiments shown in FIGS. 2 and 3, heat may be added to the front tank 732, the rear tank 766, the surge tank 780, or any combination thereof.

Figure 4:
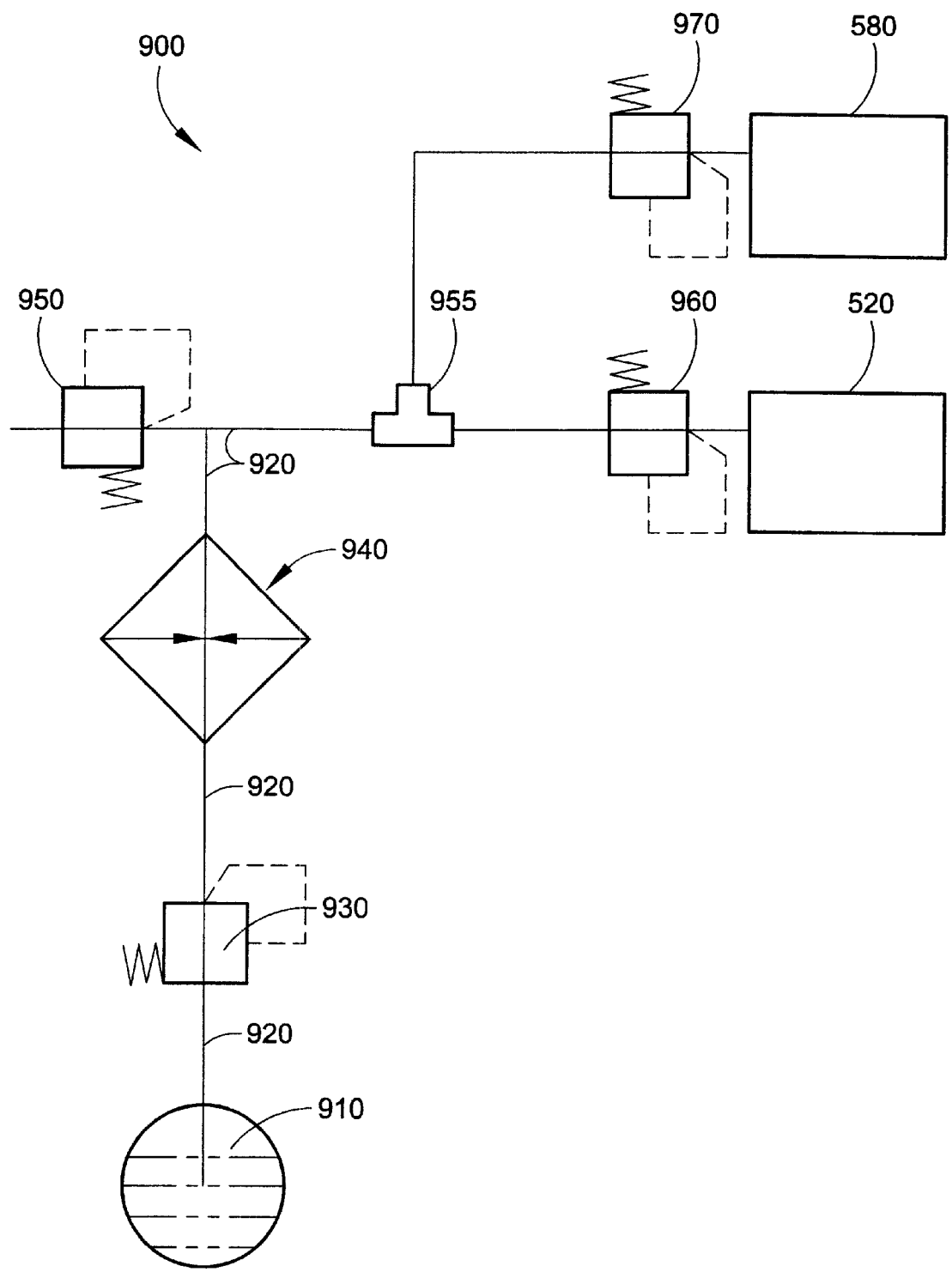
FIG. 4 is block diagram of an embodiment of a fuel communication network of the compressed gas.

With reference to FIG. 4, a compressed gas fuel supply system 900 constructed in accordance with another embodiment of the invention will be described. In one embodiment, a compressed gas fuel from a supply tank 910 is supplied to internal combustion engine(s) 570, 580 to fuel the internal combustion engine(s) 570, 580. The compressed gas fuel supply system 900 is similar to the compressed gas fuel supply system 700 discussed above with respect to FIGS. 2 and 3, but the compressed gas fuel supply system 900 also includes a pressure regulator 930 for reducing the pressure of the compressed gas fuel below the pressure in supply tank 910. Importantly, the pressure regulator 930 is located between the supply tank 910 and an exhaust heat transfer system 940. The exhaust heat transfer system 940 is similar to the exhaust heat transfer system 520 shown in FIG. 2. The portion of the exhaust heat transfer system 940 that transfers heat to the compressed gas fuel is preferably remote from the exhaust gasses of the internal combustion engines 570, 580, so that the amount of heat transferred from the exhaust heat transfer system 940 to the compressed gas fuel may be controlled.

While the compressed gas fuel supply system 900 relies in part on exhaust heat for expansion and/or vaporization of the compressed gas fuel, the system 900 utilizes a more efficient, compact, and effective means to expand and/or vaporize the compressed gas fuel than that used in system 700. Compressed gas fuel flows from the supply tank 910, through fuel hose 920, to a low temperature compatible first pressure regulator 930, which converts the compressed gas fuel from high tank pressure (100–150 psi) to approximately 60 psi. In one embodiment, the first pressure regulator 930 is a 60 psi pressure regulator capable of changing the pressure of compressed gas fuel from a range of 75–175 psi to 60 psi. Such a regulator is available from McMaster Carr as Part No. 47435K22. A pressure gauge and filter are preferably located before the first pressure regulator 930. In one embodiment, the fuel hose 920 is #6 size Propane Hose available from Mutual Propane.

When exposed to the pressure drop caused by the first pressure regulator 930, the compressed gas fuel acts as a refrigerant, transforming from a gas and/or liquid at a high pressure to a lower pressure, lower temperature, gas and/or liquid-vapor mixture. The low temperature compressed gas fuel then flows through the exhaust heat transfer system 940. A gaseous heat transfer medium is heated by the exhaust of the engines 570, 580, and is circulated through the exhaust heat transfer system 940, transferring heat to the low temperature compressed gas fuel in a fuel container, further expanding and/or vaporizing the compressed gas fuel. Since thermodynamic efficiency increases as the temperature of the heat receiving medium decreases, the low-pressure, low-temperature exhaust heat transfer system 940 is more efficient than the high-pressure, ambient-temperature exhaust heat transfer system 520.

In one embodiment, an evaporator available from Thermo King as Part No. 76R1100 is used as the fuel container in the exhaust heat transfer system 940. In other embodiments, the fuel container comprises fuel hose 920, or other fuel line with heat conducting fins attached thereto. In one embodiment, the fuel container of the exhaust heat transfer system 940 comprises the pressure regulator 930. The fuel container may also comprise a tank 510, as shown in FIGS. 1 and 2 with respect to exhaust heat transfer system 520. Generally, the fuel container may comprise any part of the compressed gas fuel supply system capable of housing compressed gas fuel, and may include any combination of the above elements. In one embodiment, the gaseous heat transfer medium is air, and a Cooling Puller Fan available from SPAL as Part No. 30100402 is used to circulate the air.

The expanded and/or at least partially vaporized compressed gas fuel flows from the exhaust heat transfer system 940, through fuel hose 920, through a three-way tee 955, and through parallel paths to second and third pressure regulators 960, 970. The second and third pressure regulators 960, 970 reduce the pressure of the compressed gas fuel to pressures required for use with internal combustion engines 570, 580. In one embodiment, the internal combustion engines 570, 580 are turbine engines, and the second and third pressure regulators reduce the fuel pressure to 52 psi. The compressed gas fuel then flows through second and third pressure regulators 960, 970 and into internal combustion engines 570, 580.

Between the exhaust heat transfer system 940 and the second and third pressure regulators 960, 970, the fuel hose 920 is preferably connected with a pressure relief valve 950. In one embodiment, the pressure relief valve 950 is a 235 psi pressure relief valve available from McMaster Carr as Part No. 49315K61. Compressed gas fuel vented through the pressure relief valve may also be routed to a vent similar to vent 742, as shown in FIG. 3.

The compressed gas fuel supply system 900 may also be constructed such that the compressed gas fuel is not supplied to the internal combustion engines 570, 580, but rather is supplied to any other well known utilization of expanded and/or at least partially vaporized compressed gas fuel. Alternatively, the compressed gas fuel supply system 900 may be part of a motor vehicle, and the compressed gas fuel from the supply tank 910 may be supplied to the internal combustion engine(s) 570, 580 to fuel the internal combustion engine(s) 570, 580. The internal combustion engine(s) 570, 580 may power the vehicle. The engine(s) 570, 580 may power the vehicle directly, as in a conventional motor vehicle, or indirectly, as in some types of hybrid electric vehicles. In an exemplary embodiment, the compressed gas fuel supply system 900 is used in a bus, as discussed with reference to the systems shown in FIGS. 2 and 3.

Although the present invention has been described above in the context of certain preferred embodiments, it is to be understood that various modifications may be made to those embodiments, and various equivalents may be substituted, without departing from the spirit or scope of the invention.

What is claimed is:

1. A compressed gas fuel supply system for use with an exhaust system of an internal combustion engine, comprising:
   a fuel container including a compressed gas fuel;
   an exhaust heat transfer system including a gaseous heat transfer medium that circulates therethrough, the exhaust heat transfer system in thermal communication with the exhaust system of the internal combustion engine for heat transfer from the exhaust system to the gaseous heat transfer medium, and the exhaust heat transfer system in thermal communication with the fuel container for heat transfer from the gaseous heat transfer medium to the fuel container for heating the compressed gas fuel in the fuel container;
   wherein the compressed gas fuel supply system is in a Hybrid Electric Vehicle (HEV).

2. The compressed gas fuel supply system of claim 1, wherein the fuel container comprises an evaporator.

3. The compressed gas fuel supply system of claim 1, wherein the fuel container comprises fuel hose.

4. The compressed gas fuel supply system of claim 1, wherein the fuel container comprises fuel line with heat conducting fins attached to the fuel line.

5. The compressed gas fuel supply system of claim 1, wherein the fuel container comprises a pressure regulator.

6. The compressed gas fuel supply system of claim 1, wherein the fuel container comprises a tank.

7. The compressed gas fuel supply system of claim 1, wherein the compressed gas fuel comprises compressed natural gas (CNG).

8. The compressed gas fuel supply system of claim 1, wherein the compressed gas fuel comprises Hydrogen ($H_2$).

9. The compressed gas fuel supply system of claim 1, wherein the fuel container is adapted to expand the compressed gas fuel, the compressed gas fuel thereby absorbing heat from the fuel container, and the exhaust heat transfer system is adapted to transfer enough heat to the fuel container to at least partially replace the heat absorbed by the compressed gas fuel when the compressed gas fuel expands in the fuel container.

10. The compressed gas fuel supply system of claim 1, wherein the compressed gas fuel comprises liquified gas fuel.

11. The compressed gas fuel supply system of claim 10, wherein the compressed gas fuel comprises propane.

12. The compressed gas fuel supply system of claim 10, wherein the compressed gas fuel comprises liquified petroleum gas (LPG).

13. The compressed gas fuel supply system of claim 10, wherein the compressed gas fuel comprises liquified natural gas (LNG).

14. The compressed gas fuel supply system of claim 10, wherein the exhaust heat transfer system is adapted to transfer enough heat to the fuel container to at least partially vaporize the liquified gas fuel in the fuel container.

15. The compressed gas fuel supply system of claim 1, wherein the gaseous heat transfer medium comprises air.

16. The compressed gas fuel supply system of claim 1, wherein the fuel container supplies heated compressed gas fuel to the internal combustion engine.

17. The compressed gas fuel supply system of claim 1, wherein the internal combustion engine is a turbine engine.

18. The compressed gas fuel supply system of claim 1, wherein the internal combustion engine is a reciprocating engine.

19. The compressed gas fuel supply system of claim 1, wherein the fuel container is located below the internal combustion engine.

20. The compressed gas fuel supply system of claim 1, wherein the Hybrid Electric Vehicle (HEV) is a bus.

21. A method of heating compressed gas fuel in a fuel container, wherein the fuel container is part of compressed gas fuel supply system for use with an exhaust system of an internal combustion engine, comprising:
    providing an exhaust heat transfer system in thermal communication with the exhaust system of the internal combustion engine and the fuel container, the exhaust heat transfer system including a gaseous heat transfer medium that circulates therethrough;
    transferring heat from the exhaust heat transfer system to the gaseous heat transfer medium circulating through the exhaust heat transfer system;
    transferring heat from the gaseous heat transfer medium circulating through the exhaust heat transfer system to the fuel container to heat the compressed gas fuel in the fuel container;
    wherein the exhaust heat transfer system is in a Hybrid Electric Vehicle (HEV).

22. The method of claim 21, wherein the fuel container comprises an evaporator.

23. The method of claim 21, wherein the fuel container comprises fuel hose.

24. The method of claim 21, wherein the fuel container comprises fuel line with heat conducting fins attached to the fuel line.

25. The method of claim 21, wherein the fuel container comprises a pressure regulator.

26. The method of claim 21, wherein the fuel container comprises a tank.

27. The method of claim 21, wherein the compressed gas fuel comprises compressed natural gas (CNG).

28. The method of claim 21, wherein the compressed gas fuel comprises Hydrogen ($H_2$).

29. The method of claim 21, wherein the fuel container is adapted to expand the compressed gas fuel, comprising the further steps of:

expanding the compressed gas fuel in the fuel container;

transferring heat from the fuel container to the compressed fuel when the compressed gas fuel is expanded; and transferring enough heat from the exhaust heat transfer system to the fuel container to at least partially replace the heat transferred from the fuel container to the compressed gas fuel.

30. The method of claim 21, wherein the compressed gas fuel comprises liquified gas fuel.

31. The method of claim 30, wherein the compressed gas fuel comprises propane.

32. The method of claim 30, wherein the compressed gas fuel comprises liquified petroleum gas (LPG).

33. The method of claim 30, wherein the compressed gas fuel comprises liquified natural gas (LNG).

34. The method of claim 30, comprising the further step of vaporizing at least a portion of the compressed gas fuel in the fuel container with the heat transferred to the fuel container from the gaseous heat transfer medium.

35. The method of claim 21, wherein the gaseous heat transfer medium comprises air.

36. The method of claim 21, wherein the fuel container supplies compressed gas fuel to the internal combustion engine.

37. The method of claim 21, wherein the internal combustion engine is a turbine engine.

38. The method of claim 21, wherein the internal combustion engine is a reciprocating engine.

39. The method of claim 21, wherein the fuel container is located below the internal combustion engine.

40. The method of claim 21, wherein the Hybrid Electric Vehicle (HEV) is a bus.

41. An exhaust heat transfer system for use with a fuel container including a compressed gas fuel and an exhaust systems of an internal combustion engine, comprising:

an exhaust heat transfer member in thermal communication with the exhaust system of the internal combustion engine;

a heat exchanger in thermal communication with the compressed gas fuel container;

one or more connection members connecting the heat exchanger and the exhaust heat transfer member for circulating a gaseous heat transfer medium therethrough to remove heat from the exhaust system and add heat to the compressed gas fuel container for heating the compressed gas fuel;

wherein the exhaust heat transfer system is in a Hybrid Electric Vehicle (HEV).

42. The exhaust heat transfer system of claim 41, wherein the fuel container comprises an evaporator.

43. The exhaust heat transfer system of claim 41, wherein the fuel container comprises fuel hose.

44. The exhaust heat transfer system of claim 41, wherein the fuel container comprises fuel line with heat conducting fins attached to the fuel line.

45. The exhaust heat transfer system of claim 41, wherein the fuel container comprises a pressure regulator.

46. The exhaust heat transfer system of claim 41, wherein the fuel container comprises a tank.

47. The exhaust heat transfer system of claim 41, wherein the compressed gas fuel comprises compressed natural gas (CNG).

48. The exhaust heat transfer system of claim 41, wherein the compressed gas fuel comprises Hydrogen ($H_2$).

49. The exhaust heat transfer system of claim 41, wherein the fuel container is adapted to expand the compressed gas fuel, the compressed gas fuel thereby absorbing heat from the fuel container, and the exhaust heat transfer system is adapted to transfer enough heat to the fuel container to at least partially replace the heat absorbed by the compressed gas fuel when the compressed gas fuel expands in the fuel container.

50. The exhaust heat transfer system of claim 41, wherein the compressed gas fuel comprises liquified gas fuel.

51. The exhaust heat transfer system of claim 50, wherein the compressed gas fuel comprises propane.

52. The exhaust heat transfer system of claim 50, wherein the compressed gas fuel comprises liquified petroleum gas (LPG).

53. The exhaust heat transfer system of claim 50, wherein the compressed gas fuel comprises liquified natural gas (LNG).

54. The exhaust heat transfer system of claim 50, wherein the exhaust heat transfer system is adapted to transfer enough heat to the fuel container to at least partially vaporize the liquified gas fuel in the fuel container.

55. The exhaust heat transfer system of claim 41, wherein the gaseous heat transfer medium comprises air.

56. The exhaust heat transfer system of claim 41, wherein the fuel container supplies heated compressed gas fuel to the internal combustion engine.

57. The exhaust heat transfer system of claim 41, wherein the internal combustion engine is a turbine engine.

58. The exhaust heat transfer system of claim 41, wherein the internal combustion engine is a reciprocating engine.

59. The exhaust heat transfer system of claim 41, wherein the fuel container is located below the internal combustion engine.

60. The exhaust heat transfer system of claim 41, wherein the hybrid electric vehicle (HEV) is a bus.

* * * * *